United States Patent [19]

Strömberg

[11] Patent Number: 4,797,066

[45] Date of Patent: Jan. 10, 1989

[54] TURBINE WHEEL HAVING HUB-MOUNTED ELASTICALLY DEFORMABLE BLADE MADE OF REINFORCED POLYMERIC COMPOSITE MATERIAL

[76] Inventor: Karl-Otto Strömberg, Kilgränd, S-302 40, Halmstad, Sweden

[21] Appl. No.: 102,563

[22] PCT Filed: Jan. 28, 1987

[86] PCT No.: PCT/SE87/00036
§ 371 Date: Sep. 21, 1987
§ 102(e) Date: Sep. 21, 1987

[87] PCT Pub. No.: WO87/04400
PCT Pub. Date: Jul. 30, 1987

[30] Foreign Application Priority Data

Jan. 28, 1986 [SE] Sweden .................................. 8600369

[51] Int. Cl.⁴ ............................................. B63H 1/26
[52] U.S. Cl. .............................. 416/230; 416/223 A; 416/229 A
[58] Field of Search ............... 416/230 R, 229 R, 223, 416/230 A, 229 A

[56] References Cited

U.S. PATENT DOCUMENTS

| 3,318,388 | 5/1967 | Bihlmire | 416/229 |
| 3,647,317 | 3/1972 | Furlong | 416/230 |
| 3,883,267 | 5/1975 | Baudier et al. | 416/230 |
| 4,022,547 | 5/1977 | Stanley | 416/230 |
| 4,643,646 | 2/1987 | Hahn et al. | 416/230 |

FOREIGN PATENT DOCUMENTS

| 341133 | 12/1971 | Sweden | 416/230 |
| 525414 | 8/1940 | United Kingdom | 416/230 |

Primary Examiner—Robert E. Garrett
Assistant Examiner—Therese M. Newholm
Attorney, Agent, or Firm—Cushman, Darby & Cushman

[57] ABSTRACT

A turbine blade produced from reinforced plastic material having a plurality of reinforcement sections (4, 6), arranged so that the direction of the reinforcement, and/or the structure, and/or the material in one section (4) differs from the corresponding reinforcement in another section, (5, 6), but that the reinforcement material in one section extends mainly in the same direction. The turbine blade also is so designed, that the deformations caused by loads and stresses optimize its pitch at increasing load.

4 Claims, 5 Drawing Sheets

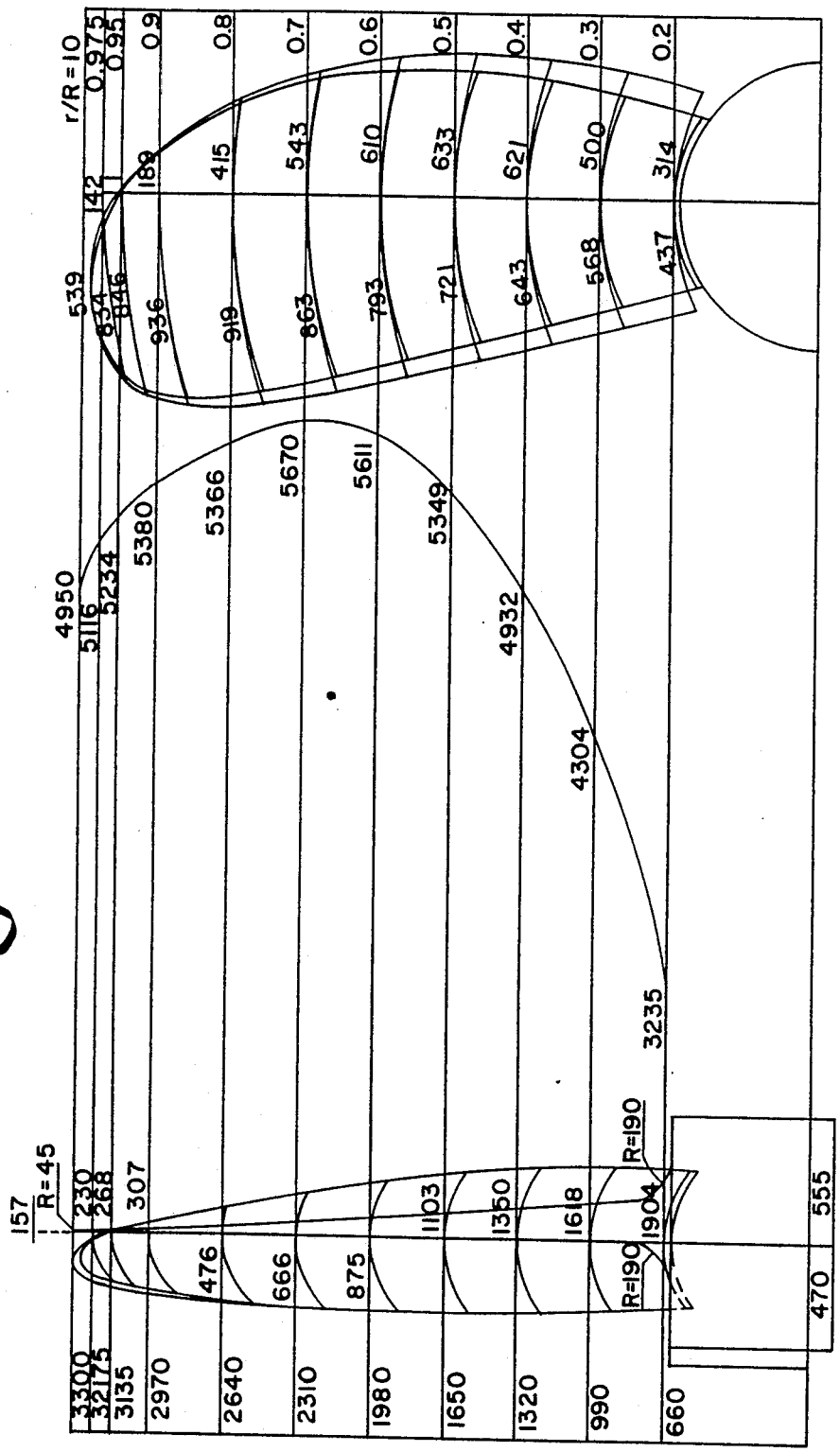

TURBINE WHEEL HAVING HUB-MOUNTED ELASTICALLY DEFORMABLE BLADE MADE OF REINFORCED POLYMERIC COMPOSITE MATERIAL

BACKGROUND OF THE INVENTION

This invention relates to a device incorporating a plurality of members acted upon by a fluid, e.g. blades, vanes, wings or the like, which are fixedly attached to the nave (i.e. hub) of an element forming part of a turbomachine, such as a propeller, turbine wheel or fan wheel, which members consist of a composite material, the matrix of which consists of a polymer.

It is previously known to produce propellers from reinforced plastic materials. One submarine rescue ship has, for example, been equipped with a shrouded propeller made of polyurethane, reinforced with 25% of long-fibered glass fiber. The production starts with a pre-shaped mat, which is bound by polyvinyl alcohol. The pre-shaped mat is put in a mold whereupon polyurethane is injected in the mould. In this manner has been imitated the stiffness against deformation of bronze propellers, but it has at the same time been obtained a product weighing only one sixth of the weight of a corresponding metallic propeller.

From U.S. Pat. No. 3,883,267 are known turbomachines, where the blades, wings or vanes consist of a metallic core and a plurality of coating layers of composite fiber material. The metal core has a portion, which is situated outside the blade per se, thus forming the blade attachment root, with the advantages of a metallic attachment, as compared to a plastic attachment. Each of the layers of composite fiber material is so arranged that the angle enclosed between the main direction of a layer and the axis of the blade decreases from a maximum value for the innermost layer or the layers situated closest to the core, to a minimum value for the outermost layer or the layers situated closest to the surface of the blade. It has thereby been tried to counteract the forces caused by mechanical stresses and temperature variations acting in the interface between the metallic core and the composite fiber material.

According to U.S. Pat. No. 3,022,547 blades for turbo-machines, such as compressors or fans, are produced by applying and bonding a plurality of fiber laminates. The fibers of at least a portion of the laminates are inclined in a chordwise direction, forward and aft of a nonradial blade axis, thus forming a biased lay-up with the blade turning center inclined forward or aft of the radial blade axis. This significantly increases the torsional frequency of the blade. In one embodiment, the fibers are inclined in the forward direction such that no fibers extend from the leading blade edge to the blade tip, but, instead, from the leading blade edge to the blade root. This orientation permits the strains to be transmitted to the blade root, where they can be more easily absorbed and dissipated by the blade supporting hub.

The purpose of arranging the fibers in the manner mentioned above is to counteract, as far as possible, the deformation that a propeller made from such a material may be subjected to during service.

Propellers seldom work under uniform and predictable conditions. There are often disturbances and/or altered service conditions, which cause problems, when they concern construction of propellers. These disturbances and changing conditions lead to the fact that the mechanical design of a propeller can not be optimized. The disturbances often lead to particular problems, such as cavitation, vibrations or noise, e.g. during ship propulsion. It is therefor necessary to compromise and to choose the geometry of the propeller so that the propeller can withstand the situations arising. This, however, means that the propeller cannot be given optimum properties. Different steps can be taken to reduce the problems. It is then possible e.g. to take steps aiming to reduce the magnitude of the vibrations, relieve the tip of the propeller blades from load, or to use propellers with tiltable blades, which make it possible to alter the pitch of the blades depending upon the load.

These steps seldom have the desired effect, though they cause extra costs and decreased efficiency and reduced reliability, due to movable parts.

SUMMARY OF THE INVENTION

The purpose of the invention is to provide improved properties in the above mentioned respects, i.e. that, for example, the propeller blade at increased service load automatically optimizes its pitch; thus, cavitation is prevented or reduced. Another purpose is to achieve low weight without requirement for assembly or post-treatment, and, therefore, a low price. The member shall, furthermore, be non-corrosive.

BRIEF DESCRIPTION OF THE DRAWINGS

In the accompanying drawings are shown some embodiments of the invention.

FIG. 3 and FIG. 4 show in diagrammatic form a deformed and a non-deformed propeller.

DETAILED DESCRIPTION

The term "blade" is used herein as generic to blades, vanes, wings and the like, which are foils attached to rotary hubs so as to describe a twisted helical path as they rotate. The term "turbine wheel" is used herein as generic to a set of blades attached to a rotary hub to be acted upon by, or to act upon, a fluid such as water or air.

Hereinbelow, the invention will be described as applied to a propeller, e.g. a ship propeller, but the invention is of course not limited to this embodiment.

According to the invention the flexibility of the plastic materials is used to give the propeller the desired properties, and this is effected by the propeller being produced from materials having anisotropic properties, i.e. from materials with different physical characteristics in different directions. This is achieved by having the reinforcement (the armoring) applied in sections, with the reinforcing elements in one section extending in the same direction, but with the reinforcing elements of one section extending in another direction than the corresponding elements of another section. By, furthermore, adapting the geometry of the propeller to the present conditions, a propeller is achieved with considerably improved properties.

Figure 1:
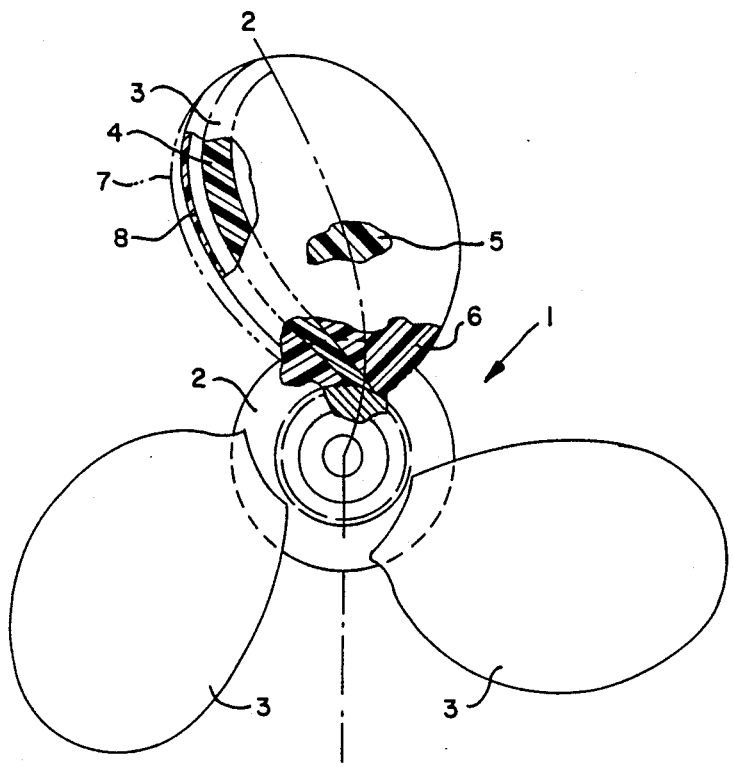
FIG. 1 shows in a front elevational view and partially in section a propeller in accordance with the invention.
Figure 2:
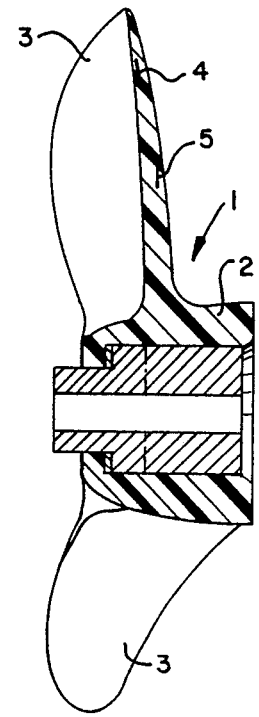
FIG. 2 is a section along line II—II of FIG. 1

In FIG. 1, is shown a propeller, constructed in accordance by the numeral the invention. This propeller, generally denoted with 1, incorporates in a known manner a hub 2, with an embedded, central metal bushing, and a plurality of members 3 projecting from the hub, e.g. propeller blades. During the production of the propeller, the propeller as shown in FIG. 1 has been divided into a plurality of reinforcement sections 4, 5, 6, in view of which loads they are exposed to, and which deformations can be permitted, or even desired. Thus, the reinforcement in one section may be of a certain quality, fiber type, fiber length and quantity, and oriented in a certain direction, whereas the reinforcing material in other sections may have other properties, including quantities and qualities, orientation. By such a reinforcement method it is possible to arrange an inner concentration of reinforcement, e.g. in form of a beam 4, which is located at the turning center of the propeller blade. This is preferably moved from its normal central location in the blade, to a position in the vicinity of the leading edge; thus, a bending moment is achieved under service load. The beam 4 is so designed that it extends past the root of the blade, into the hub 2. The beam 4 is stiff relative to the remainder of the blade, while the external laminate 5 cooperating with the beam, i.e. the outer shell of the blade, is less stiff in a direction transversal to the beam; thus, the trailing edge of the blade is bendable and turnable at increased load, i.e. a load exceeding the normal. A bending backwards and a turning of the trailing edge can, by appropriate design of the reinforcements, result in a forward bending and turning of the leading edge, whereby the angle of attack of the fluid is changed, i.e. the pitch of the blade can in a this manner be altered in negative as well as a positive direction. It is thus possible to control the flexibility of the blades in different directions, move the turning center of the blades or distribute the turning over one or several turning portions; thus, these, during load, in a controlled way, may take up deformations. By, furthermore, changing the geometry of the blades, there is obtained a possibility effectively to control the properties of the blades.

In FIG. 1 the dash-and-dot line 7 defines the outline of the blade occurring under normal load, whereas the solid line 8 shows the leading edge of the blade under increased load and the deformed blade, which means that the pitch of the blade has been reduced.

In order to achieve a propeller with the desired properties, the reinforcements 4–6 are chosen and distributed in such a manner according to the invention that the deformations occurring during service e.g. mean:

(a) that the pitch of the propeller blade decreases at increased load and returns to its initial position when the increased load decreases, (b) that the radius of curvature of each blade at increased load alters in a direction towards reduced lifting force, (c) that the blade is deformed in the direction of the lifting force at increasing load, (d) that the turning axis of the blade is positioned as close to its leading edge as possible, and (e) that the natural frequency of the blase is so high that there is no risk for natural vibrations to occur, and that the blade can be deformed also at transient load variations.

The geometry of the blade is adapted so:

(a) that sections further out from the turning center of the blade give a turning moment, which tends to turn the propeller thus that the pitch decreases at increasing load.

(b) that the sections of the blade get a bending moment which is bigger than the torsional moment of the same blade section, for the purpose of decreasing the pitch of the blade at increasing loads.

Figure 7:
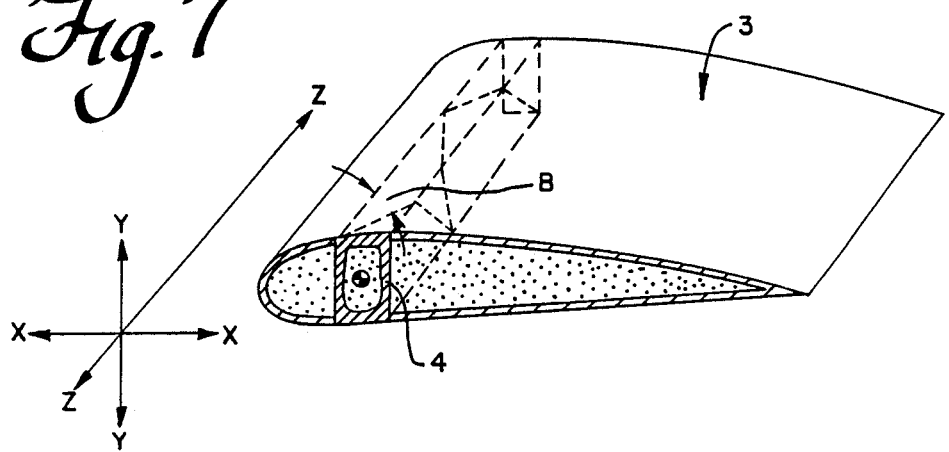
FIG. 7 shows in perspective and section a wing in accordance with the invention.

For producing a propeller in accordance with the invention it is possible to build in, known manner, the desired form with gelcoat on the surface and reinforcing mats e.g. non-woven, as outer laminate, the fiber direction of which extends in the same direction. The inner reinforcements can be one or more beams, which may be prefabricated, and the fiber direction of which can run helically along the contour of the beam, as shown in FIG. 7. Mathematical calculations and practical tests have shown, that woven glass fabric with the material properties given below, ought to give the fiber direction of 20°–35°, preferably 26° relative to the Z—Z axis in FIG. 7, which normally coincides with the extension of the beam 4 and the turning axis.

Longitudinal stiffness: $E = 36,000$ GPa
Transversal stiffness: $E = 12,000$ GPa
Modulus of rigidity: $G = 4,000$ GPa
Poisson's ratio: $V = 0.1$ Reinforcement members are preferably applied by hand, in positions calculated beforehand. The production can also be done in a split mold, but common for both methods is that it is established prior to the production where the loads occur and where the propeller blades may deform themselves and then the reinforcements are adapted thereto, and the pouring or the heat treatment (the caking).

Figure 4:
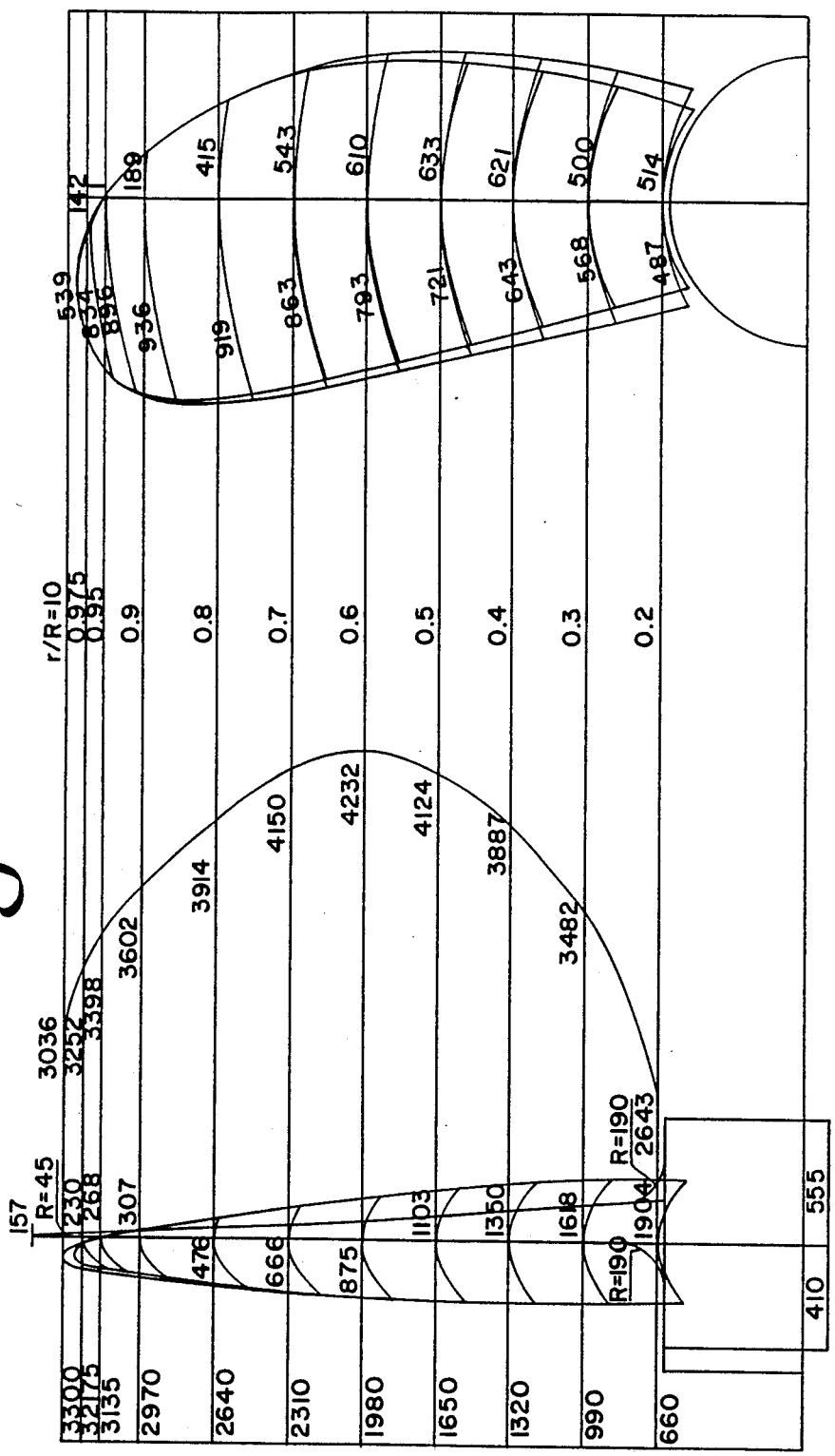
Figure 5:
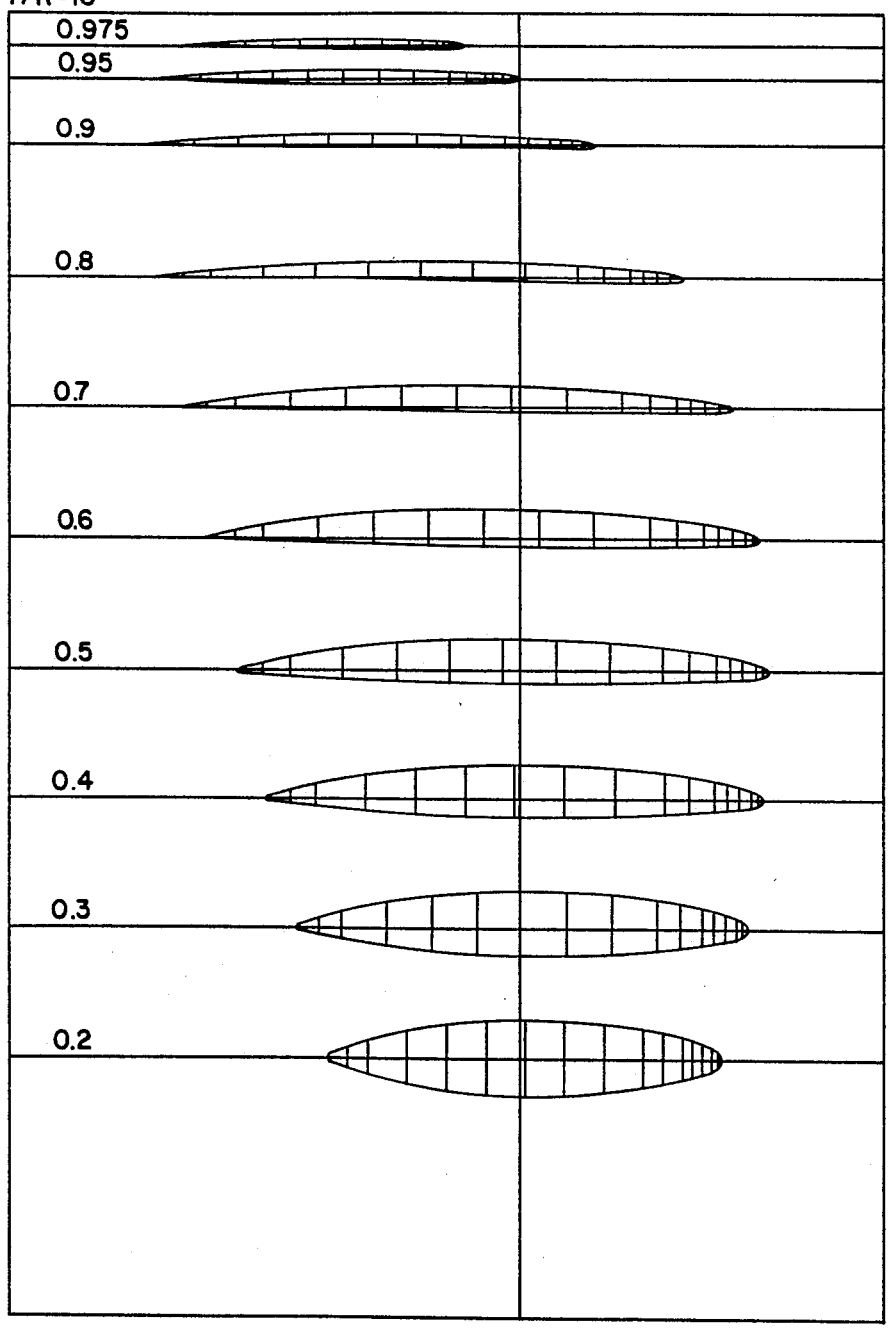
FIG. 5 and FIG. 6 show in diagrammatic form, deformed and non-deformed blade-sections.
Figure 6:
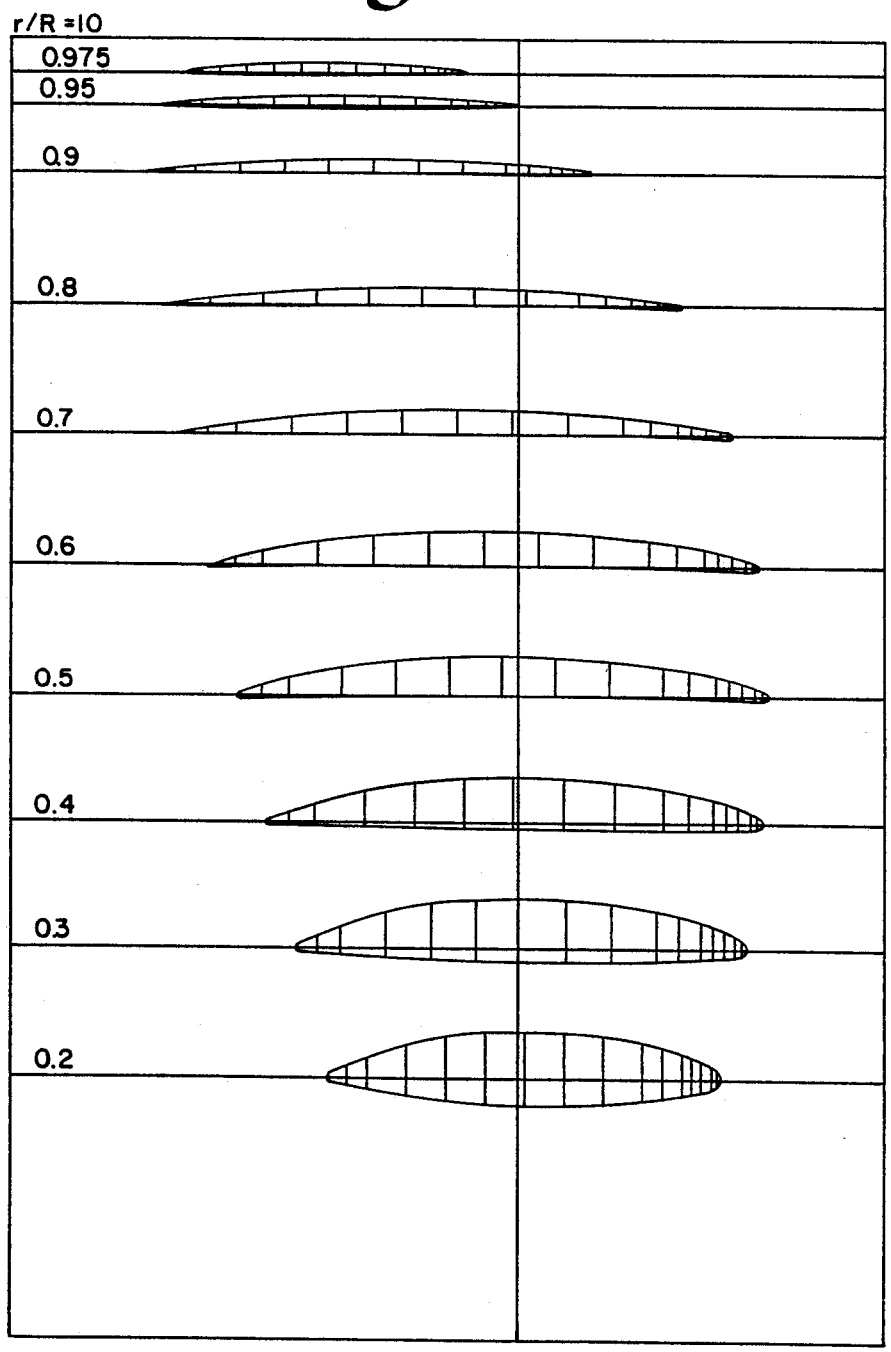

In the diagrams, R defines the radius of the entire blade and r the radius where the cuts are made. The pitch of the deformed propeller according to FIG. 4 has been allowed to turn 5.4° as compared to the non-deformed propeller according to FIG. 3.

In those sections of the propeller, where a massive, reinforced material is not required from resistance aspects, it is possible, in a known manner, to use e.g. a sandwich structure, plastic foam, or the like as a filling material, whereby the natural frequency of the blades is increased, the weight of the propeller is reduced and the material consumption is reduced.

I claim:

1. A turbine wheel, comprising:

a hub, said hub having secured thereto for rotation with the hub about an axis of the hub, a plurality of circumferentially-spaced blades each having a pitch relative to said hub;

each said blade being made of a built-up composite material having a matrix of polymeric material and a plurality of superimposed layers of reinforcing material having anisotropic properties, including at least one internal reinforcement and an enclosing shell-shaped external reinforcment;

said blades being elastically deformable, in use, relative to said hub, under loading, including strains, including deformation about a turning center of each blade for reversibly altering the pitches of said blades;

said internal reinforcement of each blade including a rigid beam arranged in the turning center of the respective blade;

each said beam being made of fibrous reinforcing material having a fiber direction arranged at a non-coinciding angle to the turning center of the respective blade;

each said external reinforcement being connected to said beam of the respective blade for cooperation therewith in portions wherein said blade is thereby made less rigid.

2. The turbine wheel of claim 1, wherein:
in each blade said internal reinforcement is arranged adjacent but spaced from a leading edge of the respective blade.

3. The turbine wheel of claim 1, wherein:
said non-coinciding angle is in the range 20°–35°.

4. The turbine wheel of claim 1, wherein:
said non-coinciding angle is about 26°.

* * * * *